Patented July 17, 1934

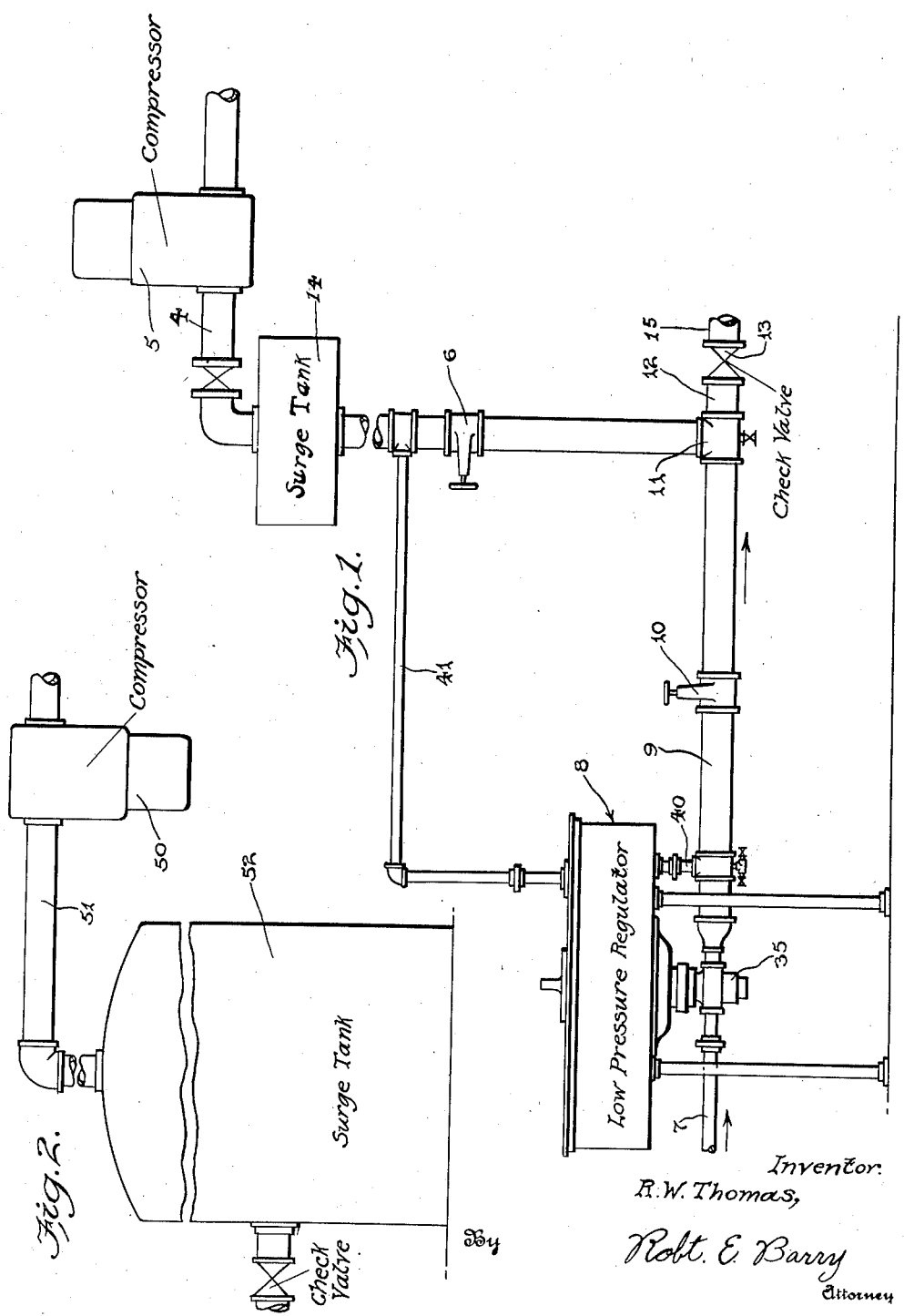

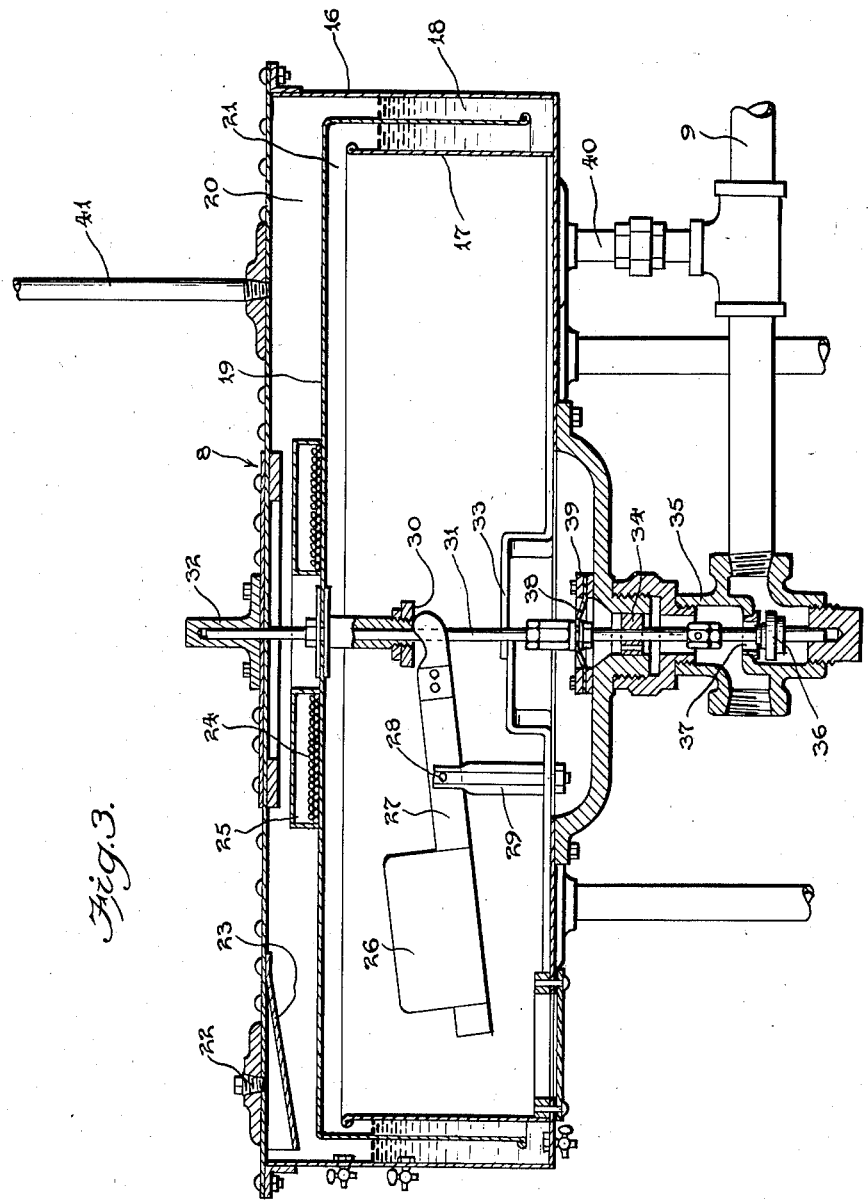

1,967,164

UNITED STATES PATENT OFFICE 1,967,164

APPARATUS FOR PROPORTIONING AND MIXING GASES

Rosswell W. Thomas, Detroit, Mich., assignor to Phillips Petroleum Company, Bartlesville, Okla., a corporation of Delaware Application June 8, 1931, Serial No. 542,962

1 Claim. (Cl. 48—184)

This invention relates to improvements in apparatus for proportioning and mixing gases. In accordance with the present invention a base gas for example may be forced through an orifice, and a fuel gas may pass through another orifice under the control of a specially constructed and sensitive regulator, which regulator maintains the upstream pressure on the fuel gas orifice identical with that on the base gas orifice, as long as the fuel gas is supplied to the inlet of the regulator at a higher pressure than the base gas. To accomplish this result, the control valve of the fuel gas is actuated by a movable partition, one side of which is subjected to the pressure of the base gas on the upstream side of the base gas orifice, and the other side of which is subjected to the pressure of the fuel gas on the upstream side of the fuel gas orifice.

With the foregoing object outlined and with other objects in view which will appear as the description proceeds, the invention consists in the novel features hereinafter described in detail, illustrated in the accompanying drawings, and more particularly pointed out in the appended claim.

In the drawings,

Fig. 1 is a side elevation of the improved apparatus.

Fig. 2 is a similar view of a portion of a modification.

Fig. 3 is a diametrical vertical sectional view partly in elevation of the specially constructed and sensitive regulator which controls the fuel gas.

Referring to the drawings, 4 designates a conduit through which a base gas, such as air, is forced by an air fan, blower or compressor 5. An adjustable orifice member 6, such as a gate valve which may be locked in adjusted positions, is interposed in the conduit 4 for controlling the base gas travelling through the conduit.

The fuel gas, such as butane and/or propane, enters the system through the pipe 7 and its flow is accurately controlled by a sensitive regulator 8 which discharges the same into a conduit 9, preferably of the same diameter as the conduit 4, and provided with an orifice member 10 such as a gate valve for regulating the flow of the fuel gas. The low pressure regulator is arranged on the upstream side of the orifice member 10 and the latter may be locked by any suitable means in its adjusted positions.

Both pipes 4 and 9 terminate in a T 11 which is arranged about the same distance from each of the orifice members 6 and 10, and in which mutually diffuse or mix the two gases. From the T, the mixture flows through a pipe 12 provided with a check valve 13, to a gas main or the like.

A surge tank 14 is interposed in the base gas line anterior to the compressor or blower, as the pulsations of the latter have a detrimental effect upon the performance of the orifice member 6, by virtue of disturbing the regular flow of the gas through the orifice.

To accomplish the desired result, the regulator 8 must be specially constructed and be very sensitive. Referring to that member, it will be observed that it consists of a gas-tight housing 16 having an endless wall 17 extending upwardly from the bottom thereof, and this wall acts with the wall of the housing to form an annular chamber in which some suitable sealing fluid 18 is arranged. Any preferred movable partition, such as a bell 19, divides the interior of the housing into an upper compartment 20 and a lower compartment 21, which are segregated from one another by the bell 19 which is partially submerged in the liquid 18.

The sealing liquid may be introduced into the housing through an opening that is normally closed by a plug 22, and in order to prevent such liquid from landing on top of the bell, the interior of the housing is provided with a suitable deflector plate 23.

The bell is weighted by shot weight 24 which may be placed in a receptacle 25 on the top of the bell.

A counter-balancing weight 26 is adjustably mounted on a beam 27 that is pivotally supported at 28 upon a post 29 that extends up from the bottom of the housing. One end of the beam contacts with an abutment 30 which is fixedly arranged on a valve stem 31. The latter reciprocates and is guided by suitable guides 32, 33 and 34. The valve stem extends from the housing into a valve casing 35 in which it has a valve head 36 to control a port 37 through which the fuel gas flows on its way to the orifice member 10. In order to segregate the interior of the valve casing 35 from the compartment 21, a movable diaphragm 38 is secured to the stem and has its edges clamped down by a suitable clamping ring 39. A branch pipe 40 on the down stream side of the casing 35 places the pipe 9 in communication with the compartment 21, so that the pressure of the fuel gas on the upstream side of the orifice member 10 exerts its influence in the compartment 21.

A conduit 41 places the compartment 20 in constant communication with the pipe 4 at the upstream side of the orifice member 6.

In actual practice, the air fan or blower 5 forces air through one side of the device at a pressure of say, 1 pound gauge, and the fuel gas is supplied say at 2 pounds gauge to the governor 8, which in turn reduces it to 1 pound gauge on the upstream side of the fuel gas orifice member 10. If the air pressure varies slightly, the governor 8 will function to make the fuel gas pressure vary accordingly, as the bell 19 is under the influence of the air pressure by means of the pipe 41. Consequently, the values on the upstream sides of the two orifices will be identical. The fact that the down stream sides of the orifices are connected to a common pipe or chamber 11 means then, that the differential across both orifices will be identical. In order to accomplish this result, the space above the diaphragm or bell in the governor 8 must communicate with the air piping 4 at the upstream side of the air orifice, and, of course, the space under the partition 19 must communicate with the fuel gas piping on the down stream side of the valve casing 35, and on the upstream side of the orifice member 10.

Instead of forcing the base gas through the piping 4, as shown in Fig. 1, both gases may be pulled through the apparatus by the compressor 50 shown in Fig. 2, which is arranged in the outlet conduit 51 posterior to the surge tank 52, in Fig. 2, which corresponds with the surge tank 14 in Fig. 1. If the apparatus is properly designed, the air forcing means can be used either on the inlet air line or on the mixture discharge line, so long as the governor 8 is under the influence of a differential pressure which does not necessarily have any relation to ordinary atmosphere, as would be the case if the compartment 20 was simply open to the atmosphere.

Although it is preferred to use a liquid sealed gasometer type governor, a regulator embodying a diaphragm, a movable piston or any other type of movable partition, may be employed.

An apparatus like that disclosed in the drawings has been experimented with for some time, and several months ago, a commercial test was run at a gas plant, which run was entirely successful.

It has been found in such runs that the weights 24 and 26 provide a very sensitive internal balancing mechanism so the governor can be set for any desired outlet pressure, either atmospheric, sub-atmospheric or super-atmopheric.

The T 11 in which the gases mutually diffuse, can be replaced by a tank such as the surge tank 52 shown in Fig. 2, in which case, of course, the check valve would be on the outlet 51 from the surge tank 52, instead of on the inlet pipe to that tank.

From the foregoing it is believed that the construction, operation and advantages of the invention may be readily understood and it is apparent that changes may be made in the details disclosed, without departing from the spirit of the invention, as expressed in the claim.

What is claimed and desired to be secured by Letters Patent is:

An apparatus for proportioning and mixing gases, comprising a mixer, a first gas pipe and a second gas pipe having their outlet ends connected to said mixer, orifice members interposed in said pipes, a gas-tight housing, an annular wall upstanding from the bottom of said housing and spaced from the wall of the housing to provide an annular trough adapted to contain a liquid sealing agent, a bell having a skirt projecting into the liquid sealing agent and dividing the interior of the housing into upper and lower chambers, a valve interposed in the second gas pipe on the upstream side of the orifice member of the latter for controlling the flow of the second gas through the last mentioned pipe, a valve stem connecting the valve to said bell, a post in the housing, a lever pivotally mounted on the post and having one of its ends engaging the valve stem, a counter-weight on the other end of the lever for normally urging the valve into closed position, said lever and counter-weight being arranged in the lower chamber, another counter-weight arranged on top of the bell, a pipe placing the upper chamber in communication with the first gas pipe on the upstream side of the orifice member of the latter, and a pipe placing the lower chamber in communication with the second gas pipe on the down stream side of the valve and on the upstream side of the orifice member of the second gas pipe.

ROSSWELL W. THOMAS.